UNITED STATES PATENT OFFICE.

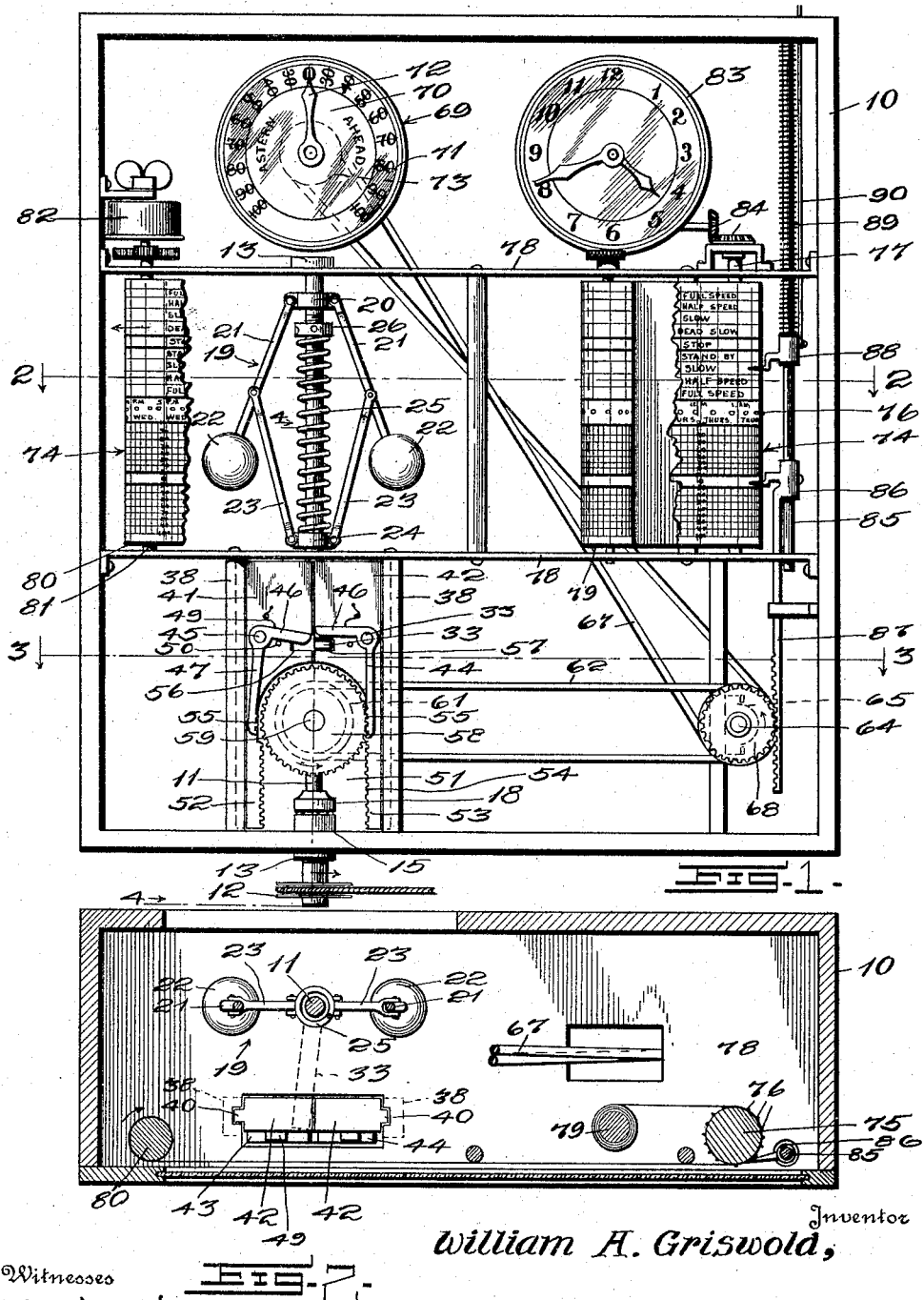

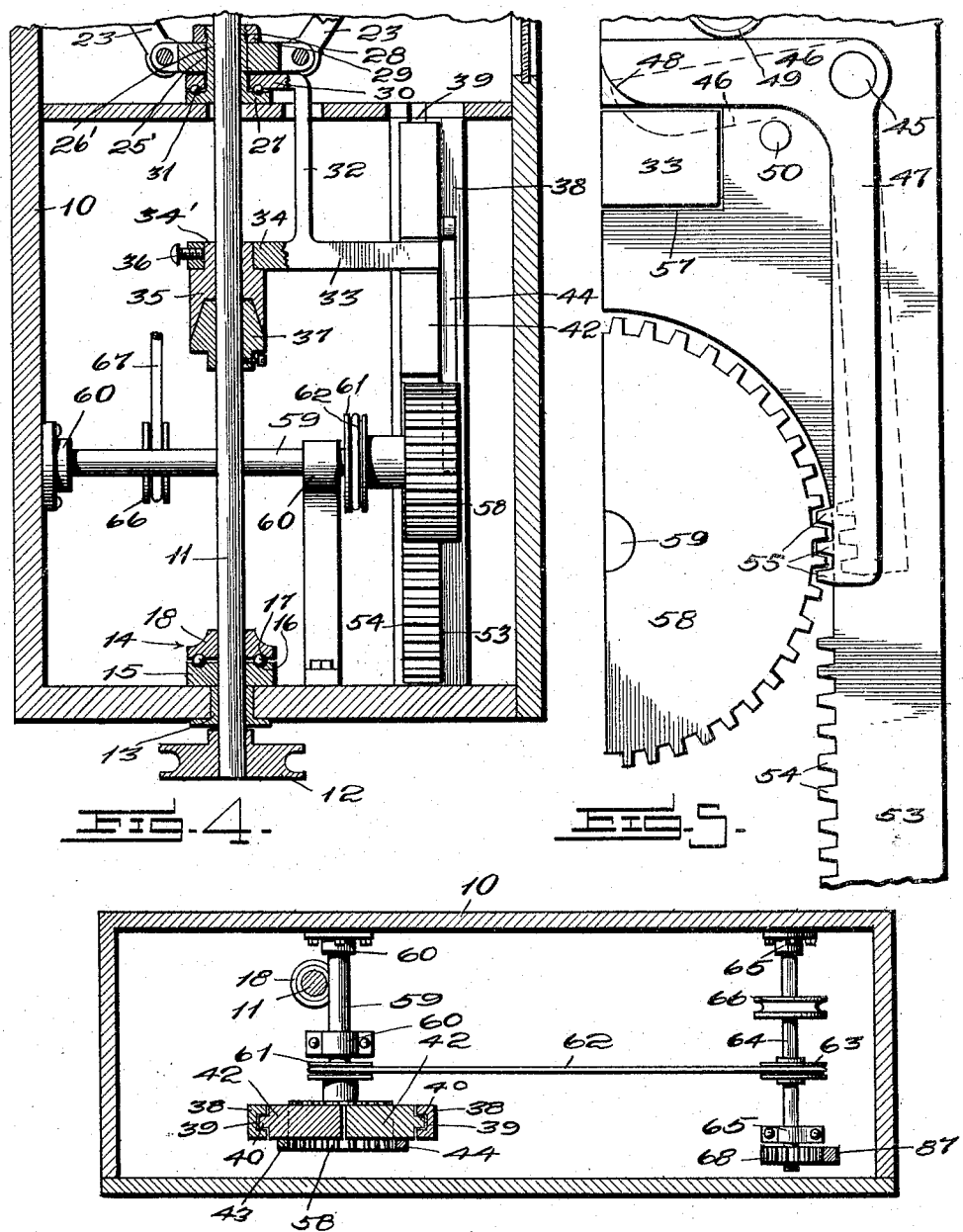

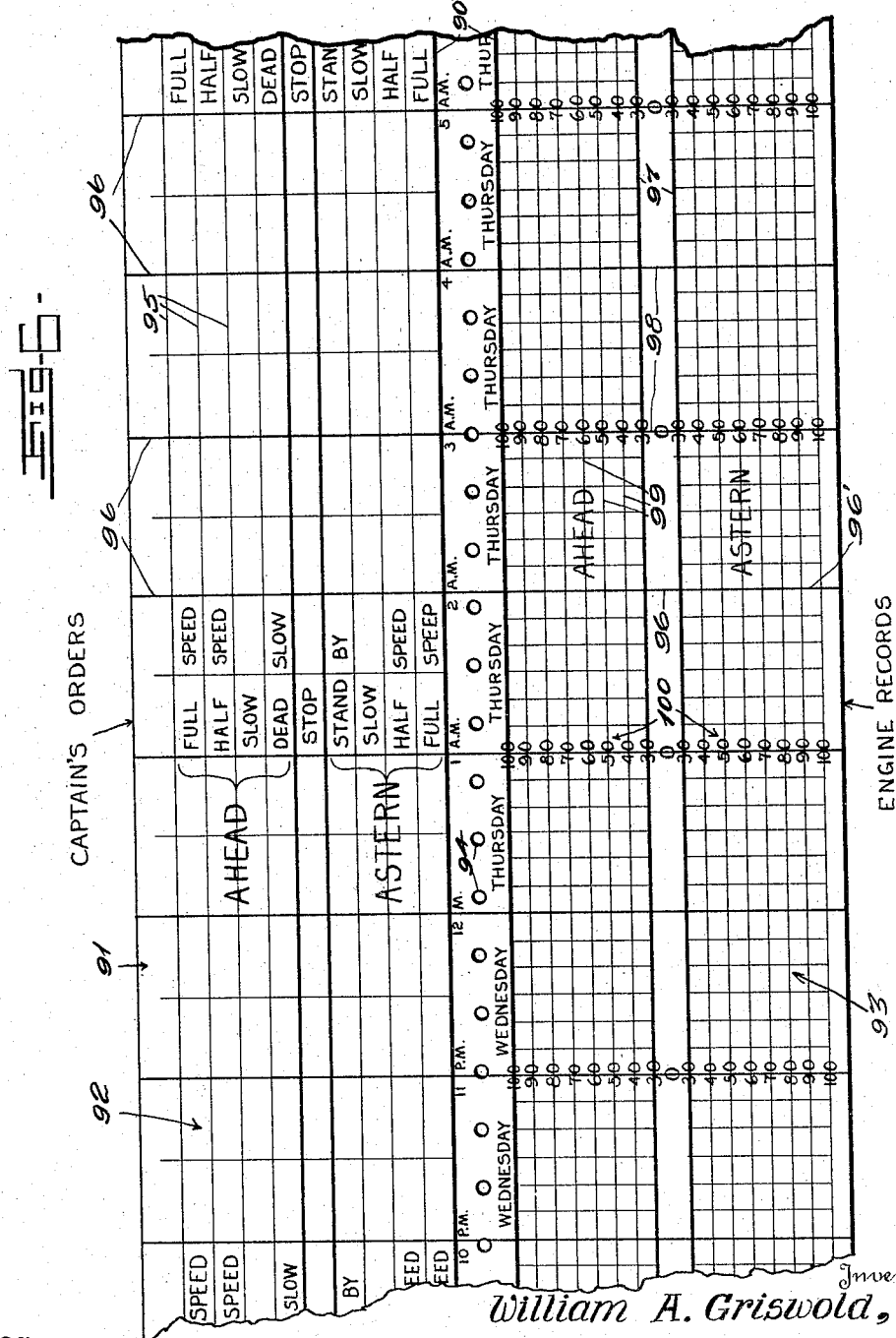

WILLIAM A. GRISWOLD, OF AKRON, OHIO.

RECORDING MECHANISM.

1,196,856.

Specification of Letters Patent.

Patented Sept. 5, 1916.

Application filed June 28, 1915. Serial No. 36,745.

*To all whom it may concern:*

Be it known that I, WILLIAM A. GRISWOLD, a citizen of the United States, residing at Akron, in the county of Summit and State of Ohio, have invented certain new and useful Improvements in Recording Mechanism, of which the following is a specification.

My invention relates to apparatus for receiving and recording signals for indicating the direction and speed at which an engine of a boat or the like is to be driven, or for receiving and recording the direction and speed at which the engine is driven, in accordance with such instructions or both.

An important object of the invention is to provide means for receiving and recording the directions and speed of operation of an engine in a boat or the like, which are wholly automatic in operation.

A further object of the invention is to provide means of the above mentioned character, which are convenient in use, and reliable in operation.

Other objects and advantages of the invention will be apparent during the course of the following description.

In the accompanying drawings forming a part of this specification and in which like numerals are employed to designate like parts throughout the same, Figure 1 is a side elevation of apparatus embodying the invention, Fig. 2 is a horizontal sectional view taken on line 2—2 of Fig. 1, Fig. 3 is a similar view taken on line 3—3 of Fig. 1, Fig. 4 is an enlarged transverse vertical sectional view taken on line 4—4 of Fig. 1, Fig. 5 is an enlarged side elevation of a slide or cross head and associated elements, and, Fig. 6 is a side elevation of a portion of a chart.

In the drawings, wherein for the purpose of illustration is shown a preferred embodiment of my invention, the numeral 10 designates a casing, within which the operating elements of the apparatus are preferably mounted. Extending preferably vertically through this casing is a rotatable shaft or spindle 11, having a pulley 12 rigidly mounted upon its lower end and suitably geared to the crank or operating shaft of an engine, which may be of the reciprocatory or rotary type. The shaft 11 is journaled through bearings 13, suitably secured to the casing 10. The shaft 11 is also provided with a downward vertical thrust bearing 14, embodying a lower stationary member 15 having an annular groove 16 to receive bearing balls 17, contacting with an upper co-acting member 18, which is rigidly secured to the vertical shaft or spindle 11. The shaft 11 has no tendency to move upwardly, but such movement will be prevented by the pulley 12 contacting with the bearing 13, as shown.

As more clearly shown in Fig. 1, the numeral 19 designates a centrifugal governor as a whole, comprising an upper cross head 20, rigidly mounted upon the shaft 11. This cross head has depending arms 21 pivotally connected therewith, to swing in a vertical plane, but incapable of swinging horizontally with relation to the cross head. To the lower ends of the arms 21 are secured balls or weights 22, and arms 23 are pivotally connected with the arms 21, above these weights. The arms 23 have their lower ends pivotally connected with a vertically movable lower cross head 24, slidably mounted upon the shaft 11, attention being called to Figs. 1 and 4. The upward movement of the cross head 24 is opposed by a suitably stiff coil spring 25, contacting therewith and with a tension regulating nut 26, screw-threaded upon the shaft 11. It is obvious that when the speed of rotation of the shaft 11 increases, the weights 22 move upwardly by centrifugal force, and effect an upward movement of the cross head 24. I wish it understood that the invention is in no sense restricted to the specific type of centrifugal governor shown and described, as other types of centrifugal governors may be advantageously employed.

As more clearly shown in Fig. 4, the cross head 24 is provided with a central opening 25′, receiving a sleeve 26′, which is slidably mounted upon the shaft 11. This sleeve is provided at its lower end with a flange 27 and its upper end 28 is screw-threaded for receiving a ring 29. Arranged between the cross head 24 and the flange 27 is an apertured plate 30, freely rotatable upon the sleeve 26′. The flange 27 is provided with an annular groove to receive bearing balls 31, as shown. Connected with the plate 30 is a depending arm 32, carrying a horizontal shifting arm 33, preferably formed integral therewith. This shifting arm 33 is provided with an apertured head 34, which fits upon the reduced extension 34' of a preferably cone clutch element 35, and is clamped thereto by a bolt 36 or the like. The clutch element 34 is rotatably mounted upon the shaft 11 and is arranged to frictionally contact with a co-acting clutch element 37, rigidly secured to the shaft 11. It is thus apparent that when the shaft is started in its rotation in either direction the centrifugal governor being then practically inactive, the clutch elements 35 and 37 have frictional contact, and serve to swing or shift the arm 33 laterally, in either direction, depending upon the direction of rotation of the shaft 11.

Arranged near the lower portion of the vertical shaft 11 and to one side of it, are stationary vertical guides 38, more clearly shown in Figs. 1 and 3. The inner sides of these guides are preferably provided with grooves 39, receiving tongues 40 formed upon vertically movable slides or carriages 41, 42. These slides or carriages are adapted to move longitudinally with relation to each other.

As clearly shown in Figs. 1 and 5, the numerals 43 and 44 designate bell crank levers, which are identical and are pivotally connected with the slides or carriages 41 and 42 respectively, as shown at 45. Each bell crank lever embodies horizontal and vertical arms 46 and 47, as shown. The horizontal arm 46 has its free end preferably beveled, as shown at 48, and this arm is forced downwardly by a spring 49. The downward movement of the arm is limited by a stop 50 formed upon the carriage. The slides or carriages 41 and 42 have their lower portions cut away forming an opening 51 and reduced depending bars 52 and 53, integral with the carriages. The bars 52 and 53 have teeth 54 and serve as rack bars. The arms 47 are provided upon their inner sides near their lower ends with teeth 55, adapted when they are swung inwardly to serve as an upper continuation of the rack bars, as will be more fully explained.

The slides or carriages 41 and 42 are provided above the opening 51 with horizontal openings 56 and 57, adapted to alternately receive the outer end of the shifting lever 33. The shifting lever is shown as arranged within the opening 57, the same having contact with the beveled end 48 of the arm 47, swinging it to the horizontal position and the arm 47 to the vertical position so that the teeth 55 serve as a continuation of the adjacent rack-bar 53, more clearly illustrated in Fig. 5.

The numeral 58 designates a shifting gear, arranged between the rack-bars 52 and 53, to engage therewith, and with the gear teeth 55 of bell crank levers, the same being sufficiently wide for this purpose, as clearly shown in Fig. 4. The gear 58 is rigidly mounted upon a horizontal transverse shaft 59, journaled through bearings 60. This shaft has a preferably grooved pulley 61 rigidly mounted thereon, engaged by a belt 62, extending to the right to engage a pulley 63. The pulley 63 is rigidly mounted upon a shaft 64, journaled in bearings 65. A second preferably grooved pulley 66 is rigidly mounted upon the shaft 64, and engages a preferably crossed belt 67, extending upwardly, for a purpose to be described. A pinion or gear 68 is rigidly mounted upon the shaft 64 for a purpose to be described.

Preferably arranged in the upper portion of the casing 10 is a combined speed and direction indicator, designated as a whole by the numeral 69. This indicator embodies a dial 70, having graduations or scales 71, designated "Astern" and "Ahead". These graduations or scales preferably indicate the number of revolutions per minute at which the engine is operating. The indicator embodies a pointer or hand 72, to coöperate with these scales, and this hand is turned by a preferably grooved pulley 73 engaged and driven by the belt 67.

The numeral 74 designates recording mechanism as a whole, embodying an escapement roll 75, having an annular set of teeth 76. This escapement roll is rigidly mounted upon a vertical shaft 77, which is journaled through openings in horizontal bars 78, held stationary within the casing 10.

The numeral 79 designates a chart carrying roll, which is pivotally mounted within or between the bars 78. Arranged adjacent the opposite ends of the bars 78 is a take-up roll 80, rigidly mounted upon a rotatable shaft 81, journaled through openings in the bars 78. The shaft 81 is rotated clockwise, in the direction of the arrow upon the roll 80, by a normally active spring motor 82, of any well known or preferred type, and suitably geared to the shaft. The rotation of the escapement roll 75 is controlled by a clock 83, the shaft 77 being geared with the shaft of the clock rotating the hour hand, through the medium of bevel gears 84 and associated elements, while it is understood that the shaft 77 could be geared with the clock shaft rotating the large or minute hand.

The numeral 85 designates a stationary vertical guide shaft, upon which is slidably mounted a lower pen or marking device 86, of any well known or preferred construction. The marking device 86 is shifted longitudinally of the roll 75 by a rack-bar 87, the teeth of which engage the pinion 68. It is thus apparent that the marking device 86 is automatically operated, in a manner to be described.

Slidably mounted upon the guide rod 85 is a second marking device 88, moved downwardly by compressible coil spring 89, and upwardly by a cable 90 or the like. The cable 90 is connected with a cable (not shown), which is connected with an instrument known as a "chadburn" in the captain's office, the second named cable extending to the engineer's room and operating means embodying an indicating hand, which gives the orders to the engineer. It is obvious that the cable 90 may be operated independently of this instrument.

In Fig. 6, I have shown a section of a chart or ribbon upon which the records are made, the same being designated as a whole by the numeral 91. This chart is divided by horizontal lines 90' into a main upper horizontal section 92, designated "Captain's orders" and a main lower horizontal section 93 designated "Engine records." Between the lines 90' are perforations 94, for receiving the teeth 76 upon the escapement roll 75. The upper main section 92 is provided with horizontal lines 95, providing horizontal spaces designated "Full speed," "Half speed," "Slow," etc. The horizontal spaces are arranged in upper and lower groups designated "Ahead" and "Astern" as shown. The upper main section is also provided with vertical lines 96, which preferably divide the sections up into hour sub-sections. These hour sub-sections are also designated by days and there are twenty-four of them for each day. The lower main section 93 is divided by horizontal lines 97 into upper and lower "ahead" and "astern" sections, which are vertically ruled by lines 96'. The space between each pair of lines 96' represents an hour. Each hour space is vertically ruled by vertical lines 98, the spaces between which indicate 10 minutes. The hour sections are horizontally-ruled by lines 99 designated by scales or graduations 100 which represent the number of revolutions per minute that the engine is running. The "ahead" and "astern" sections are similarly ruled except that the numerals in indicating scales 100 run in opposite directions, as shown.

In the operation of the apparatus, the recording sheet 91 is carried by the roll 79, passed about the escapement roll 75, and connected with the take-up roll 80 to be wound thereon. This recording sheet is made to travel from right to left, and preferably at a speed so that the distance between each pair of vertical lines 96' is covered in an hour.

When the captain desires to give an order to the engineer, the cable 90 is manipulated to bring the marking device 88 in proximity to the "ahead" section or "astern" section, upon the main section 92, as the case may be. As the sheet 91 is continuously traveling a record will be made of such order or orders with respect to the time at which it is given.

Assuming that the order received by the engineer is "ahead full speed," he starts the engine rotating forwardly, which rotates the shaft 11 clockwise, as indicated by the arrow. This rotation of the shaft 11, turns the clutch element 37, which contacts with the clutch element 35, and swings the shifting arm 33 to the right into the opening 57. This movement of the shifting lever 33 swings the horizontal arm 46 of the bell crank lever 44 upwardly and the lower arm 47 thereof inwardly, to bring the teeth 55 carried thereby into contact or mesh with the teeth of the pinion 58. As the speed of rotation of the shaft 11 in this direction increases, the weights 22 move upwardly, carrying the cross head 24 upwardly. The arm 33 and associated elements now serve to elevate the carriage 42. This upward movement of the carriage brings the teeth of the rack-bar 53 in mesh with the teeth of the pinion 58, whereby this pinion continues to rotate counter-clockwise during the upward movement of the carriage, which of course continues in accordance with the operation of the centrifugal governor. The turning of the pinion 58 is transmitted to the pulley 63 through the medium of the belt 62. This movement of the pulley 63 is transmitted to the wheel 73 by the crossed belt 67. The wheel 73 then turns the hand 72 clockwise, such hand coöperating with the scale 71 for indicating the number of revolutions per minute ahead, that the engine is making. The pinion 68 also moves the rack bar 87, which moves the marking device 86 upwardly upon the "ahead" section of the main section 93. This marking device will draw a line upon the "ahead" section in connection with the horizontal and vertical lines thereof, making a record which will show the forward speed of rotation per minute of the engine during any given hour of a given day, as is obvious. It is obvious that the marking device 86 will raise and lower in accordance with the operation of the centrifugal governor.

When the engineer receives an order "astern full speed" the engine is first brought to a stop before reversing. This stops the rotation of the shaft 11. When the engine starts to operate in a reverse direction, the shifting arm 33 will be moved to the left into the opening 56. When the speed of rotation of the shaft increases in this direction, the carriage 40 will rise. This movement of the carriage will turn the gear 58 clockwise, whereby the pointer 72 will be moved counter-clockwise to coöperate with the "astern" scale. The marking device 86 is now moved downwardly to make the record upon the "astern" section of the main section 93 of the record sheet.

I wish it understood that the apparatus is not necessarily restricted for use in connection with a record sheet having the specific designations or rulings, but that the same may be widely varied as may be found advantageous.

When the term "indicating mechanism" is employed, in the claims, it is intended to cover a signal means like the indicator 69 or the recorder 76.

It is also to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In apparatus of the character described, an indicating mechanism adapted to be operated in opposite directions, a pivoted member having operative connection with the indicating mechanism to operate it, a pair of separate independently acting members arranged near the opposite sides of the pivoted member and adapted to be alternately thrown into operative engagement therewith, and a centrifugal governor to first throw either of the independently acting members into operative engagement with the pivoted member and subsequently bodily move the same in one direction to effect a turning movement of the pivoted member.

2. In apparatus of the character described, an indicating mechanism adapted to be operated in opposite directions, a movable member having operative connection with the indicating mechanism to operate it, a pair of separate independently acting members spaced a substantial distance apart and arranged near the movable member and adapted to be alternately thrown into operative engagement therewith to move it in opposite directions, and centrifugal governor means to first throw either of the independently acting members into operative engagement with the pivoted member and subsequently bodily move the same in one direction to effect a movement of said movable member.

3. In apparatus of the character described, an indicating mechanism adapted to be moved in opposite directions, a centrifugal governor, a plurality of independently movable members adapted to move the indicating mechanism in opposite directions, and automatic means to connect one movable member with the centrifugal governor upon its rotating in one direction and the other member with the centrifugal governor upon its rotation being reversed.

4. In apparatus of the character described, an indicating mechanism adapted to be moved in opposite directions, a centrifugal governor, a gear arranged near the centrifugal governor, a plurality of rack bars arranged upon opposite sides of the gear, to drive it in opposite directions, and normally having their teeeth out of contact with the teeth of the gear, means to bring the teeth of one rack bar into mesh with the teeth of the gear when the centrifugal governor is rotated in one direction, and the teeth of the other rack bar into mesh with the teeth of the gear when the direction of rotation of the centrifugal governor is reversed, and driving connecting means between the gear and the indicating mechanism.

5. In apparatus of the character described, a centrifugal governor, a gear arranged near it, a plurality of rack bars disposed upon opposite sides of the gear to move it in opposite directions, a shifting lever to alternately contact with portions of the rack bars to move them in one direction, means operated by the centrifugal governor to move the shifting lever, indicating mechanism, and driving connecting means between the indicating mechanism and the gear.

6. In apparatus of the character described, a centrifugal governor, a spindle connected with it to drive the centrifugal governor, clutch mechanism embodying a pair of co-acting clutch elements carried by the spindle, a shifting lever connected with one clutch element, connecting means between the shifting lever and the centrifugal governor, a gear, a plurality of carriages having rack-bars arranged upon opposite sides of the gear, pivoted levers secured to the carriage and embodying arms having teeth disposed upon opposite sides of the gear and other arms adapted to be engaged by the shifting lever and moved thereby, and indicating means operated by the gear.

7. In apparatus of the character described, indicating mechanism adapted to be operated in opposite directions, a pivoted member having operative connection with the indicating mechanism to drive it in opposite directions, independently movable operating members disposed near the pivoted member to turn it in opposite directions, a centrifugal governor, and an element connected with the centrifugal governor and adapted to be shifted laterally in either direction to effect an operative connection between one movable operating member and centrifugal governor whereby the action of the centrifugal governor will bodily shift the operating member for turning the pivoted member.

8. In apparatus of the character described, a rotatable shaft, a centrifugal governor carried by the shaft, an arm having an extension provided with a swiveled connection with a portion of the centrifugal governor, a clutch element carried by the arm and adapted to move the arm in opposite directions and loosely mounted upon the shaft, a co-acting clutch element rigidly mounted upon the shaft, a pivoted member, independently acting operating members arranged near the pivoted member to turn it in opposite directions and adapted to have operative engagement with the arm when it is swung in the proper direction, indicating mechanism, and driving connecting means between the indicating mechanism and the pivoted member.

In testimony whereof I affix my signature in presence of two witnesses.

WILLIAM A. GRISWOLD.

Witnesses:
W. T. VAUGHAN,
VERDIES R. HARDY.

Copies of this patent may be obtained for five cents each, by addressing the "Commissioner of Patents, Washington, D. C."